United States Patent [19]
O'Brien et al.

[11] Patent Number: 6,055,569
[45] Date of Patent: Apr. 25, 2000

[54] ACCELERATING WEB ACCESS BY PREDICTING USER ACTION

[75] Inventors: Michael David O'Brien, Bellevue; Peter Gerard Gravestock, Redmond, both of Wash.

[73] Assignee: Go Ahead Software Inc., Bellevue, Wash.

[21] Appl. No.: 09/014,013

[22] Filed: Jan. 27, 1998

[51] Int. Cl.[7] ....................................................... G06F 13/00
[52] U.S. Cl. .......................... 709/223; 709/203; 709/224
[58] Field of Search ................................... 709/203, 217, 709/218, 223, 224, 219

[56] References Cited

U.S. PATENT DOCUMENTS

| 5,572,643 | 11/1996 | Judson . | |
| 5,727,129 | 3/1998 | Barrett et al. | 709/224 |
| 5,802,292 | 9/1998 | Mogul | 709/203 |
| 5,835,905 | 11/1998 | Pirolli | 707/102 |
| 5,878,223 | 3/1999 | Becker et al. | 709/223 |

OTHER PUBLICATIONS

Wang et al., "Prefetching in World Wide Web", IEEE, 1996.
Padmanabhan et al., "Using Predictive Prefetching to Improve World Wide Web Latency", ACM, vol 26, No. 3, p. 22–36, Jul. 1996.

*Primary Examiner*—Zarni Maung
*Assistant Examiner*—Philip B. Tran
*Attorney, Agent, or Firm*—James L Davison

[57] ABSTRACT

A smart browser working in conjunction with a HTTP server that selectively downloads WWW pages into the browser's memory cache. The determination of which pages to download is a function of a probability weight assigned to each link on a Web page. By evaluating that weight to a predetermined browser criteria, only those pages most probably to be downloaded are stored in the browser's memory cache. The download is done in the background while the browser user is viewing the current Web page on the monitor. This greatly enhances the speed with which the viewer can "cruise" the Web while at the same time conserving system resources by not requiring the system to download all the possible links.

12 Claims, 3 Drawing Sheets

FIG. 4

```
<HTML>
<HEAD>
<TITLE>Client User's Present Page </TITLE>
<HEAD>
<BODY>
<IMG SRC = "any">
<H1> This text is displayed on the client user's monitor </H1>
<A HREF="HTTP://www.server.com/path/filename.ext"Probability="nn%">Today's Topic </A>
</BODY>
</HTML>
```

FIG. 5

```
"HT. request header"
    GET/index.html    HTTP/1.0
    Host:mycomputer
    User-agent: IE
    Date: 06/08/98
    Probability: 95%

Server response
    HTTP/1.0   503 Site Temporarily Unavailable
```

ACCELERATING WEB ACCESS BY PREDICTING USER ACTION

BACKGROUND—FIELD OF INVENTION

This invention relates generally to client/server networks and more particularly to a method of accelerating Web access by predicting user actions in an Internet environment.

BACKGROUND—DESCRIPTION OF PRIOR ART

At last estimate 100 million Internet users access a body of information that is doubling every six (6) months. The Internet is a network of linked computers. The Internet is typically accessed by a person using a personal computer running a special software program that is commonly referred to as a browser. The computers that the personal computer of the client user networks with are called servers. These are usually powerful mid-range or server computers.

There are special rules that must be applied to ensure that the client computer and server computer can communicate. These rules are called protocols. This invention deals with the area of the Internet called the World Wide Web (WWW). The WWW uses a protocol called Hypertext Transfer Protocol (HTTP). This protocol deals with how information is passed from the server computer to the client computer. The information itself must be in a special format defined as the Hypertext Markup Language (HTML) or the newer format as of this description called the Extensible Markup Language (XML).

However finding information on the Internet can be slow and frustrating. At peak hours of usage many client users may be trying to access the Internet simultaneously. This causes frequently congestion. This lack of fundamental bandwidth (the ability of many users to access the WWW simultaneously) is a limitation that will not be solved quickly. Internet users have become increasingly frustrated with the time it takes to access information from Web servers. Web pages very commonly contain links to other Web pages. These links allow the client user to jump to another place on the displayed page, or jump to a different page on the same server or to even jump to a Web page on a different server that may be thousands of miles away. This is done by merely placing the cursor of the client computer over the displayed link (often underlined or a different color to let the user know that it is a link) and clicking the mouse button. On the typical mouse this is the left button. The links lead the client users to retrieve another HTML or XML page that may contain, but is not limited to, text, graphics, audio, applets (small application programs) and other data.

Presently known in the art and available are software programs, referred to as "Web Accelerators". They can recognize the links present on the displayed Web page and start to transparently (not visible to the client user) download the information they represent into a storage area of the client computer called a memory cache. The memory cache can be, but is not limited to RAM (Random Access Memory), hard disk, tape or other device. This dramatically reduces the time it takes for the user to access the link's information. By the time the client user is done viewing the displayed page and clicks on the next link, that information that the link points to is already available in the client user's memory cache. The problem with this method is that the information is downloaded without regard to the probability that the client user would have ever selected that link, and the time to download all the links usually exceeds the time the user takes to read the original page. As a result the client user is obtaining, via the network resources, much more information than is likely to be used. This uses more network resources and cache space than is truly needed.

This invention addresses these problems by allowing the web page developer to give a weight to each link corresponding to the likelihood that the client user will choose that link next. Naturally those links that the user is most likely to choose are assigned the highest weight. Those links that are rarely used are assigned little or no weight. Even if the client user happens to choose a link that has not been downloaded to the client user's cache, there is no adverse effect other than a normal retrieval of the linked information.

This methodology of assigning a selection probability weight to the available links on a Web page frees up network bandwidth. This is accomplished by not caching the little or rarely used links that are presented to the user.

BRIEF SUMMARY OF THE INVENTION

The invention described herein is composed of two elements. The first element is the interposition of a probability code into each linked element of the HTML or XML document. The code corresponds to the selection probability weight of link predicted by the web page developer. The selection probability weight of that link corresponds to the likelihood that that link will be next chosen by the user. The second element is comprised of adding software code to the client user's browser that identifies that a probability weight has been assigned to each link. After identifying the probability weights assigned to the links the browser then evaluates those weights against a predetermined browser criteria and selects the most suitable links for downloading into the client user's browser cache.

BRIEF DESCRIPTION OF THE DRAWINGS

For a more complete understanding of the present invention, reference is now made to the following detailed discussion of the embodiments illustrated in the accompanying drawings, wherein:

FIG. 4 shows a sample of the HTML code that uses the key word "Probability";

FIG. 5 shows a representative example of the message the client user's browser would send to a server to retrieve a page of information.

DETAILED DESCRIPTION OF THE INVENTION

Figure 1:
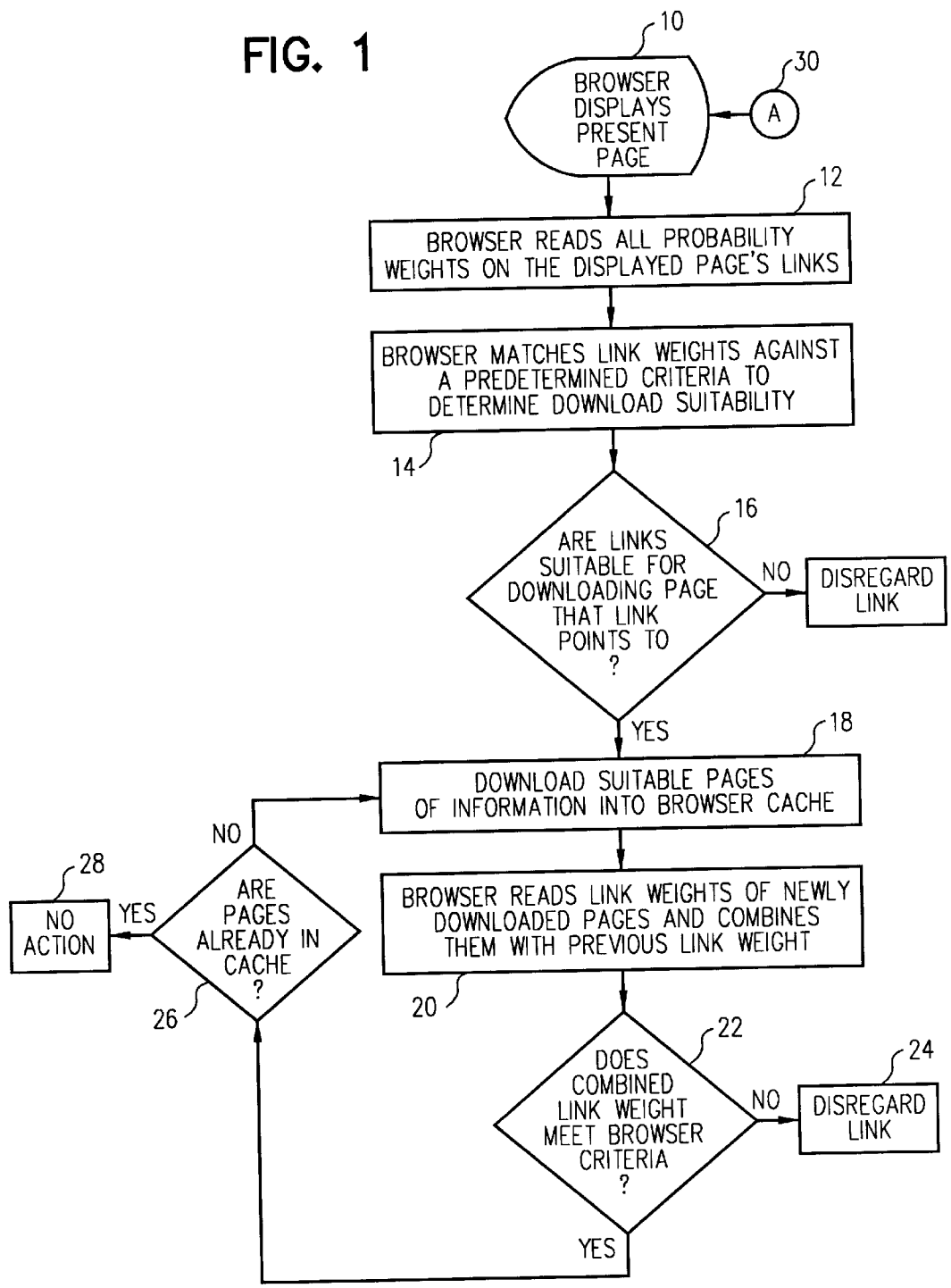
FIG. 1 provides an illustration of the logic flow the embodiment uses to store HTML or XML Web pages in the background.
Figure 2:
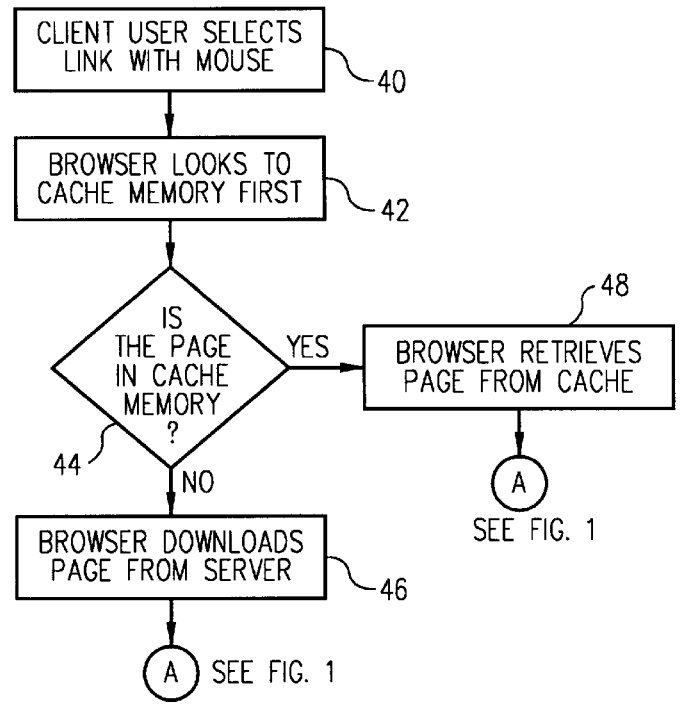
FIG. 2 provides an illustration of the logic flow when the embodiment receives a command from the client user to select another link.

The Internet is a computer network based on the client-server model. The Internet is typically accessed by users having client personal computers. This access is gained most commonly through an Internet Service Provider or an on-line service provider such as America On-Line®, Compuserve® or MSN®. The client users usually have software loaded on their systems called browsers. The most common browsers as of this writing are provided by Netscape® and Microsoft® (named the Navigator® and Explorer® respectively). These browsers allow the client users to access remote servers that contain files in a text or graphical user interface (GUI) style. The browser is capable of retrieving (also known as downloading) these files for use by the client computer. The files themselves may contain text, graphics, video, audio or even small applications that can run on the client's computer, called applets. The graphical user interface is one that allows the viewer to see a wealth of graphics and other visual elements.

The path that the client user browser takes to these server sites is defined by individual Uniform Resource Locators (URLs). This is the electronic address of the server site and the selected page or object. The World Wide Web (WWW) is a collection of servers that use the Hypertext Transfer Protocol (HTTP). As mentioned above this protocol allows the client user to have access to files that may contain among other things: audio, video, graphics and even small applications that the client user's computer can run, called applets.

The files that are accessible using HTTP servers are formatted using a Standard Generalized Markup Language (SGML) known as Hypertext Markup Language (HTML) or a newer format known as the Extensible Markup Language (XML). This language allows the web page developer to insert URL links into the viewed page, that, when chosen by the client user, takes the client user to that information to which the link was connected. Again, this information may be text, graphics, audio and applets, as examples but not limiting.

The first element of the present invention is the addition of software code instructions designed to be incorporated into the browser being used by the client user. This software enablement will allow the browser to identify that the links on the page being viewed 10 have probability weights assigned 12. After recognizing that weights have been assigned, the browser software then evaluates those weights against a predetermined criteria 14. If the weights meet this predetermined criterion 16 then the browser software downloads the information that the link refers to 18. This software code incorporation may be done without undue experimentation by one with ordinary skill in the art in browser software development.

The Hypertext Markup Language referred to uses "tags" which are shown by the symbol <>. A typical tag that is used to format a line uses a starting "tag" that looks like this: <tag>and an ending tag looks like this: <tag>. These "tags" denote commands that are not viewable by the client user but are read and interpreted by the client user's browser.

The second element of the invention is adding a key word to the tag that denotes each link URL on a web page FIG. 4. This key word imparts a probability weight that this link will be chosen by the client user. This probability weight is either statically predicted by the Web page developer or in the preferred embodiment the probability weight can be dynamically updated. The information used to determine the assigned probability weight can be derived by counting and saving the data associated with which links the visitors to the Web page actually choose. In addition to the browser being enabled through software instructions to read and interpret these links' URL key words, the linked pages may be transparently downloaded or not during the time that the client user is viewing the present web page. Whether the page is downloaded or not depends on the evaluation criteria chosen by the client's browser.

In the preferred embodiment the client will continue to download links and link combinations that meet the criteria 20. It is possible for the client browser to combine the weights of the links on the first level (those links associated with the current page the browser is displaying) with the weights on the second, third or even fourth level 20. Second level links are those that the links on the displayed page have on their pages. Third level links are those that the second level links point to. These new links are present on the HTML or XML pages that have been transparently retrieved and are residing in the client's memory cache.

This technique of retrieving links that reside on previously retrieved links is sometimes called "spidering". This technique is presently known in the art. Also presently known in the art is a software enablement possible in the client computer that sets limits on the number of links retrieved depending on various criteria. As an example, these features are available in the product Got-It.™ of the Go Ahead Software Company™. Also well known in the art is the ability to delete the HTML page information from the client's memory cache when a predetermined criteria is met.

In the preferred embodiment the browser code allows either the user or a third party (such as a network administrator assigned to support the user's computer) to adjust the browser sensitivity to the various probability weights given to the links. An example, but by no means a limitation, would be to limit the link downloads to those links that are coded with a probability of 60% or higher that they will be selected by the client user. A second example, but not a limitation, is to enable the browser to only download or retrieve those pages that have links weighted at 90% and only download or retrieve those second level pages whose links equal or exceed 80%.

Figure 3:
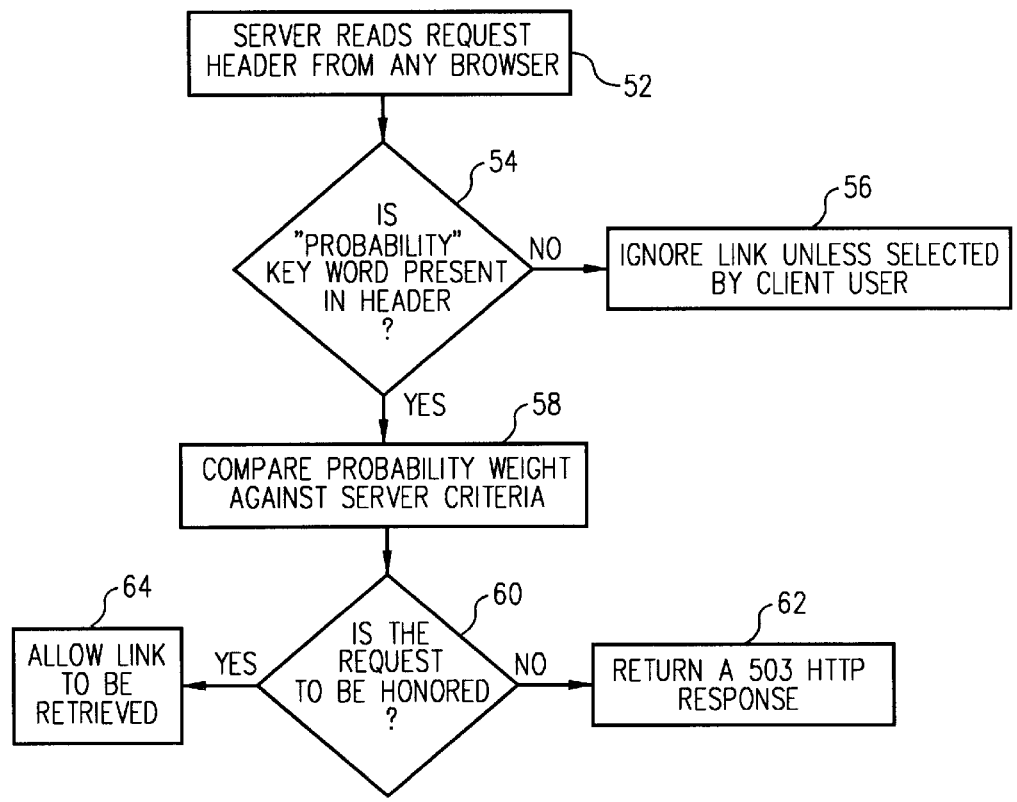
FIG. 3 shows the ensuing logic flow to determine if the server will respond to the client's browser request.

Also in the preferred embodiment, the server addressed by the link will have the capability to deny access by the client computer depending on a criterion set by the server FIG. 3. As an example, but not a limitation, would be the server denying the client request when the probability weight of the requested link is less than 80%. These denials could be based on network traffic, server traffic or other criteria. The ability to code this embodiment is well known to those ordinarily skilled in the art of server software development. The server reads the request header from the browser 52 and checks that the key word "probability" is present 54. If the key word is present then the server compares the probability weight against a predetermined server criteria 58. If the key word is not present then the server ignores the link request initiated by the client user's browser 56. If the probability weight is found suitable by the server 60 then the link may be retrieved by the browser 64. If the probability weight is unsuitable then the server will return the "503" response 62 as shown in FIG. 5. This code is representative of the browser request to download (retrieve) a page and the possible server response if the server criteria is not met.

Also in the preferred embodiment are three methodologies of setting the probability weight of the links. The choice of methodologies will depend on what the Web site developer determines is optimal for that particular Web site. The first methodology is to hard code the probability factor onto the link. The choice of weights can be initially estimated by the developer and then updated manually by reviewing the log data of which sites were chosen. The second methodology would be to dynamically update the probability weights at predetermined intervals by enabling the server software with the capability to scan, interpret, and vary the probability weights of the links by again using the logged selection data. The third methodology would be to enable the server with the ability to identify a particular client user. It is possible for the server to place information into the client user's computer. This technique is known in the art as leaving a "cookie". The information could consist of a history of links the client user has retrieved. Therefor the weight of the probability factor that the link will be chosen can be customized for each client user. The result of this is that the server can not only predict the web pages that the client may wish to retrieve but also build a web page on the fly containing those elements that it is predictable that the client user would want.

In all embodiments it is important to understand that while the links are being evaluated against the browser and server criteria and are being downloaded in the background while the client user is viewing the displayed page, the browser is also waiting for the user to select, typically by the use of the mouse button, another link 40. When this occurs the browser discontinues the background downloading and looks into its memory cache 42 to see if the page has already been downloaded 44. If the page has been then the browser retrieves the page from its memory cache 48 and presents it to the client user for display 10. If the page is not in the cache then the browser downloads the page from the server address the link pointed to 46, and presents it to the client user for display 10.

What is claimed is:

1. A method to predict, in a computer network, what information is next to be downloaded from a server into a memory cache of a client computer comprising the steps of:
   contacting a server as requested by a client computer;
   retrieving a page of information associated with the server address requested, said page of information containing at least one link to other pages of information;
   displaying the page of information on said client computer;
   reading a key word containing a probability weight encoded in a tag denoting said link;
   matching said probability weight with a predetermined criteria residing in the client computer; and
   downloading the information associated with said link into the memory cache of said client computer if said probability weight meets said criteria;
   wherein the access time required to view the next page selected is greatly reduced.

2. A method to predict, in a computer network, what information is next to be downloaded from a server into a browser's memory cache of a client computer comprising the steps of:
   contacting a server that uses the HTTP protocol as requested by a client computer;
   retrieving a page of information wherein the information associated with the server address requested is formatted in HTML or XML;
   displaying the page of information on said client computer wherein the client computer is enabled with a Web browser;
   interpreting the probability weight of what page is to be selected next by the client user wherein the probability weight is contained in a HTML key word encoded within each page link, wherein each page link is in the form of an URL address, displayed on the page on the client computer;
   matching the probability weight with a predetermined criteria residing in the client's computer browser software; and
   downloading the page associated with said link into the memory cache of said client computer if said probability weight meets said criteria;
   wherein the access time required to view the next page selected is greatly reduced, if the page selected by the client user matches the pages already retrieved and waiting in said browser memory cache.

3. The method of claim 3 further comprising the steps of:
   having the predetermined criteria be adjustable by the client user;
   wherein the client user can adjust the amount of network resources used depending on the network conditions.

4. The method of claim 2 further comprising the steps of:
   having the predetermined criteria be adjusted by a client user's network administrator;
   wherein the network administrator can adjust the amount of network resources used depending on the network conditions.

5. The method of claim 2 further comprising the steps of:
   reading the pages already downloaded into the client user's browser cache;
   reading the key words containing the probability weight of the links contained on said pages;
   evaluating the probability weights of said links; and
   further downloading the pages those links point to, into the client user's browser memory cache.

6. The method of claim 2 further comprising the steps of:
   adjusting the probability weight of the link manually based on counting which links are actually chosen by the client user's upon visiting the page;
   recording said count; and
   adjusting the probability weight of each link depending on results of the recording.

7. The method of claim 2 further comprising the steps of:
   adjusting the probability weight of the link dynamically, based on counting which links are actually chosen by the client user's upon visiting the page;
   recording said count; and
   adjusting the probability weight of each link at periodic intervals depending on results of the recording.

8. The method of claim 2 further comprising the steps of:
   counting which links are actually chosen by a particular client user upon visiting the page;
   storing said count into the client users memory in the form of a "cookie";
   retrieving said "cookie" upon a follow-up visit of the Web site by said particular client user; and
   adjusting the probability weight of each link depending on results of the "cookie" information.

9. A system that predicts, in a computer network, what information is to be next downloaded from a server, the system comprising:
   a client user's computer, a server computer, a networked link between said client computer and said server computer;
   the client computer with the capability to obtain and display information stored on the server computer;
   the server computer storing information in the form of pages which in turn contain links to other pages of information;
   said links having a probability factor, encoded within, that said links will be downloaded;
   said client user's computer enabled to interpret said probability factor;
   said client user's computer also enabled to match said probability factor to a predetermined criteria residing in said client user's computer; and said client user's computer then downloading said information prior to being selected by user, into the browser cache of said client user's computer.

10. The system in claim 9 further comprising:

the client user's computer enabled by a browser to be able to read HTML or XML formatted Web pages;

the server using HTTP protocol;

the links using a URL address to point to another Web page, site or object;

the probability assigned to each link to be in the form of a key word encoded into said link;

the browser enabled to interpret said probability factor and match said probability factor against a predetermined criteria.

11. A system that predicts, in a computer network, what information is likely to be downloaded next from the server, the system comprising:

a client user's computer, a server computer, a networked link between said client computer and said server computer;

the client computer having the means for obtaining and displaying information stored on the server computer;

the server computer having the means for storing information in the form of pages which in turn have the means for containing links to other pages of information;

said links having the means for having an associated probability factor encoded within said links that they will be selected by a client computer user;

said client computer having the means for interpreting said probability factor;

said client computer also having the means for matching said probability factor to a predetermined criteria residing in said client computer; and said client computer then having the means for downloading said information prior to being selected by the user, into a memory cache of said client computer.

12. The system in claim 11 further comprising:

the client user's computer enabled by a browser means for obtaining and displaying information stored on the server computer;

the server computer enabled by a HTTP formatted means for storing pages of information which in turn have a HTML or XML formatted means for containing links to other pages of information;

said links having a HTML or XML formatted means for having an assigned probability factor encoded within said links that predict if said links would be selected by said client computer for downloading;

said client computer having the browser means for interpreting said probability factor;

said client computer also having the browser means for matching said probability factor to a predetermined criterion residing in said client computer.

* * * * *